United States Patent [19]

Holtz et al.

[11] Patent Number: 5,269,609
[45] Date of Patent: Dec. 14, 1993

[54] PIN TYPE BEARING RETAINER

[75] Inventors: James R. Holtz, Bristol; Stephen M. Mondak, Watertown, both of Conn.

[73] Assignee: The Torrington Company, Torrington, Conn.

[21] Appl. No.: 740,119

[22] Filed: Aug. 5, 1991

[51] Int. Cl.⁵ .................... F16C 33/46; F16C 33/52
[52] U.S. Cl. ................................. 384/623; 384/574
[58] Field of Search ............ 384/623, 621, 572, 574, 384/575, 577-579, 567, 571

[56] References Cited

U.S. PATENT DOCUMENTS

| | | | |
|---|---|---|---|
| 868,105 | 10/1907 | Lockwood | 384/574 |
| 940,168 | 11/1909 | La Fave | 220/309 |
| 1,003,226 | 9/1911 | Wootten | 220/309 |
| 1,122,596 | 12/1914 | Hess | 384/623 |
| 1,196,288 | 8/1916 | Reeves et al. | 384/567 |
| 1,307,262 | 6/1919 | Lockwood | 384/478 |
| 1,355,918 | 10/1920 | Schroeder | 220/309 |
| 1,427,520 | 8/1922 | Close | 384/575 |
| 1,617,613 | 2/1927 | Wells | 384/578 X |
| 2,130,258 | 9/1938 | Baker et al. | |
| 2,267,708 | 12/1941 | Cox | |
| 2,622,947 | 12/1952 | Wallgren | 384/571 |
| 2,943,732 | 7/1960 | Kovaleski et al. | 220/309 |
| 3,004,809 | 10/1961 | Bratt | 384/623 |
| 3,144,284 | 8/1964 | Ortegren | |
| 3,667,821 | 6/1972 | Rader | 384/574 |
| 4,419,800 | 12/1983 | Bihler et al. | 384/575 X |
| 4,844,626 | 7/1989 | Colin | 384/127 |

FOREIGN PATENT DOCUMENTS

| | | | |
|---|---|---|---|
| 1049167 | 1/1959 | Fed. Rep. of Germany | 384/574 |
| 995524 | 12/1951 | France | 384/579 |
| 128796 | 11/1928 | Switzerland | 384/572 |
| 581399 | 10/1946 | United Kingdom | 384/574 |
| 1356729 | 6/1974 | United Kingdom | |
| 2218750 | 11/1989 | United Kingdom | 384/572 |

Primary Examiner—Thomas R. Hannon
Attorney, Agent, or Firm—John C. Bigler

[57] ABSTRACT

A pin type retainer for roller bearings is stamped in one piece from flat metal stock. The flat metal is first drawn into a cup shape having a broad flange around an open first end and a closed second end. The closed end provides solid support and alignment while stamping pins from the broad flange. The pins are then final shaped by swaging or machining into cross sectional forms for a variety of applications. The second end is then opened to form a ring. The pin type retainer can be modified for use with a retaining ring or a seal against contaminants. The pin type retainer can be formed from a variety of materials, including steel. An embodiment using plastic resin is also disclosed.

12 Claims, 3 Drawing Sheets

PIN TYPE BEARING RETAINER

BACKGROUND OF THE INVENTION

This invention relates generally to roller bearing assemblies, and, more particularly, to pin type retainers for maintaining the correct alignment of bearing rollers.

The most commonly used types of retainers in roller bearing assemblies are cage type and pin type retainers. The cage type retainer is an annular assembly having a series of equally spaced pockets within which the bearing rollers are positioned. While these cages are effective in maintaining the proper orientation of each roller in the bearing races, the structure separating the rollers requires considerable space and reduces the number of rollers in the bearing assembly and, therefore, the load capacity.

Pin type retainers do not have structure between the rollers. Such retainers generally consist of a ring having a plurality of evenly spaced pins extending either radially or axially, as required. Each pin serves as an axle to support a bearing roller in position in the roller bearing assembly.

Because pin type retainers do not have structure between the rollers, they allow bearing assemblies to be more densely populated with rollers. Thus, bearing assemblies with pin type retainers can have greater load capacities than bearing assemblies of the same size with cage type retainers. A pin type retainer is generally assembled from a number of separate parts, including a cast or machined ring and a series of equally spaced pins. These pins extend from the ring and are inserted axially in the rollers to maintain the correct orientation of the rollers.

The manufacture of pin type retainers is costly, requiring the precision assembly of the separate parts. To limit the cost of assembly, some pin type retainers are stamped from flat stock strip material to form teeth. The flat stock is bent into a circle and butted ends are welded to form a cylinder with the teeth pointing in one direction. The pins are then bent or swagged outward at an angle to form the final configuration. Precise forming of the stamped component is difficult, as is fixturing it for machining or swagging the pins to their final shape.

The foregoing illustrates limitations known to exist in present roller bearing retainers. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a stamped pin type bearing retainer having a drawn ring and a plurality of equally spaced pins projecting from at least one side of the ring. The pins and the ring are of a single piece of material. The pins are shaped to be insertable into axial bores in rollers of a roller bearing assembly such that the pins maintain relative tangential positions of said rollers in said roller bearing assembly.

In another aspect of the present invention, this is accomplished by providing a method including the steps of forming a hat-shaped cup from a flat piece of metal. Regular portions of a brim of the hat-shaped cup are removed to form a regular plurality of pins integral with a remainder of the hat-shaped cup. A closed end of the hat shaped cup is then opened to form a ring.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
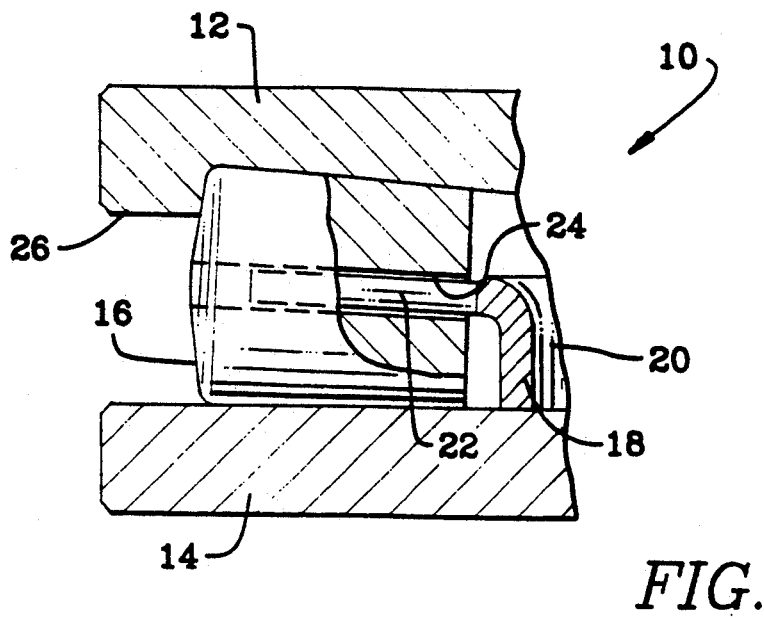
FIG. 1 is a partial cross-sectional view of an embodiment of the present invention within a roller bearing assembly.

Referring to FIG. 1, a roller bearing assembly 10, according to one embodiment of the present invention, has an upper race 12 and a lower race 14 spaced apart in rolling engagement by a plurality of rollers 16. A pin type retainer 18 is positioned axially between upper race 12 and lower race 14. A central ring 20 of pin type retainer 18 supports a plurality of pins 22 extending generally radially from ring 20. Each pin 22 is inserted in an axial bore 24 of each of rollers 16 to maintain the correct alignment of rollers 16 in races 12 and 14. A flange 26 of upper race 12 prevents rollers 16 from moving radially outward from roller bearing assembly 10.

During operation, pins 22 of pin type retainer 18 serve as axles for rollers 16. This prevents rollers 16 from moving out of their desired rotational position.

Figure 2:
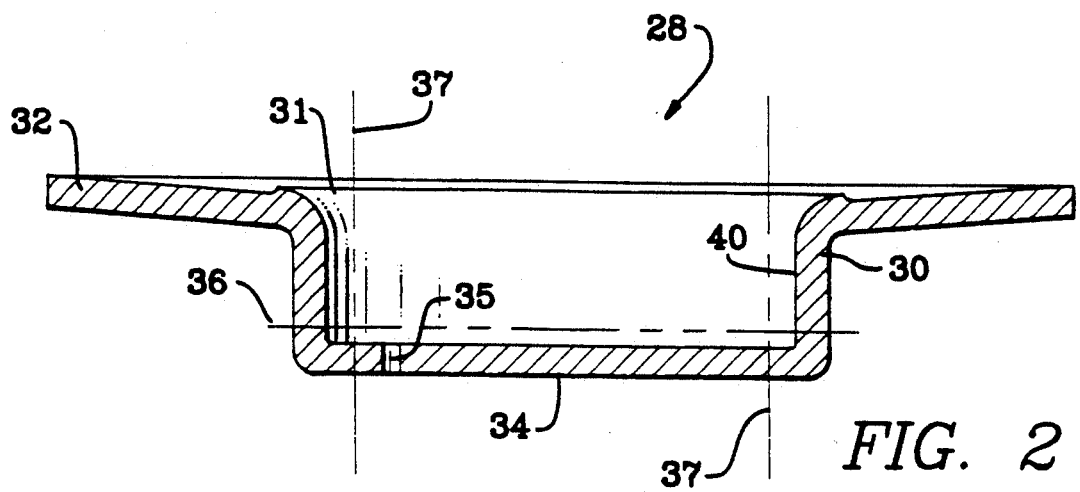
FIG. 2 is a cross-sectional view illustrating an intermediate stage of the embodiment of FIG. 1.

Referring to FIG. 2, during manufacture, cup 28 is drawn from flat sheet stock into a hat shape. Cup 28 is formed with cylindrical wall 30 that is open on top end 31, broad flange 32 ringing top end 31 of cylindrical wall 30, and bottom 34 that closes the end opposite top end 31.

Bottom 34 is formed to facilitate mounting cup 28 on a fixture, not shown, whereon further forming of pin type retainer 18 (FIG. 1) is continued. One or more indexing holes 35 may be provided in bottom 34 to mate with indexing pins in the fixture, whereby precise positioning of cup 28 is facilitated during subsequent operations. Mounting holes, keyways, or the like, may secure and orient cup 28 in a desired position for continued processing. In addition, bottom 34 adds rigidity to the structure of cup 28, helping to prevent the deformation of cylindrical wall 30 during processing operations.

Figure 3:
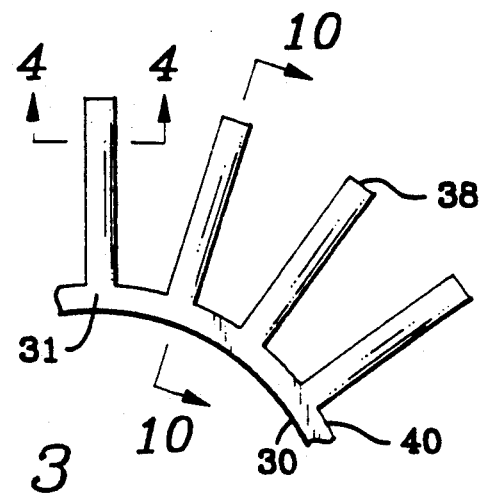
FIG. 3 is a partial plan view of the embodiment of FIG. 1.

Referring now to FIG. 3, broad flange 32 of FIG. 2 has been stamped to remove portions thereof to form an annular series of pins 38 along top end 31 of cylindrical wall 30. This one-piece construction eliminates the need for attaching pins 38 to cylindrical wall 30. The result of the initial stamping is a near final form component that requires little additional forming and can be conveniently fixtured for final swagging or machining and hardening of its pins.

Figure 4:
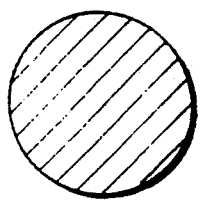
FIG. 4 is a cross-sectional view of an embodiment of the present invention, taken along the line 4—4 of FIG. 3, wherein the pins have a circular cross-section.
Figure 5:
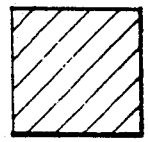
FIG. 5 is a cross-sectional view illustrating an embodiment of the present invention, taken along the line 4—4 of FIG. 3, wherein the pins have a rectangular cross-section.

Pins 38 are given their final cross-sectional shape by machining, swaging or the like. The cross-sectional shape may be, but is not limited to, the shapes shown in FIGS. 4, 5, and 6. The cross-section at line AA of FIG. 3 is represented in FIG. 4 as circular, in FIG. 5 as rectangular, and in FIG. 6 as modified circular having a perimeter including two arcuate portions of a circle and upper and lower flat segments.

Following the forming process previously described, pins 38 may be induction hardened to improve their wear characteristics. Preferably, cylindrical wall 30 is not hardened, to ensure that any stress resulting from the stamping may be relieved. Also, hardening of cylindrical wall 30 might by itself cause deformation.

Finally, bottom 34 may be cut away from cylindrical wall 30 as indicated by cut line 36 (FIG. 2). Alternatively, bottom 34 may be opened at cut line 37 to provide a controlled bore for piloting pin type retainer 18 on a shaft. Cutting at either cut line 36 or cut line 37 modifies cylindrical wall 30 into a ring 40.

Referring to FIG. 3, pins 38 are shown extending radially from ring 40. However, it should be noted that in other embodiments, pins 38 may extend axially from ring 40 or may radiate from ring 40 at a different angle as required for a particular application.

Pin type retainer 18 may be formed of any suitable material, but for many applications is preferably of steel or other metal.

Figure 7:
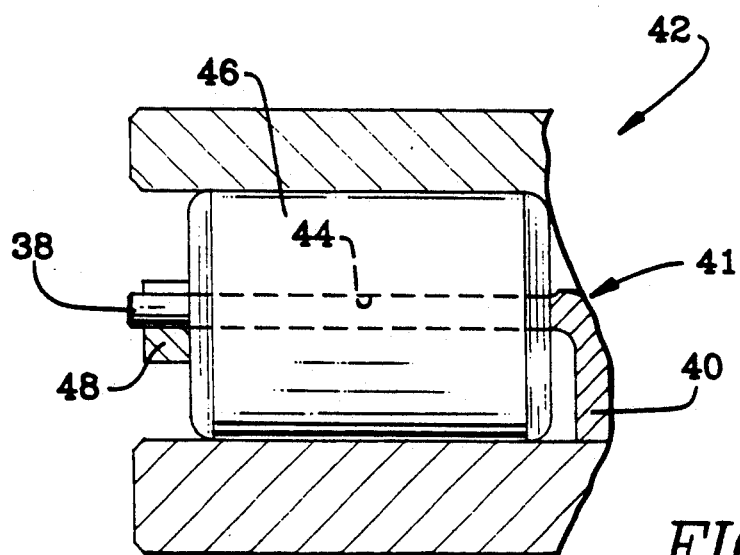
FIG. 7 is a cross-sectional view of a bearing assembly including an embodiment of the present invention adapted for use with a retaining ring.

Referring to FIG. 7, a bearing assembly 42 is shown with a stamped pin type retainer 41. In this embodiment, pins 38 extend through bores 44 of rollers 46. Retaining ring 48 surrounds and is affixed to the outer ends of pins 44 to provide stiffening and to prevent rollers 46 from moving in a radially outward direction either prior to assembly, or in some installations, during operation. Stamped pin type retainer 41 is formed of steel or other suitable metal.

Figure 8:
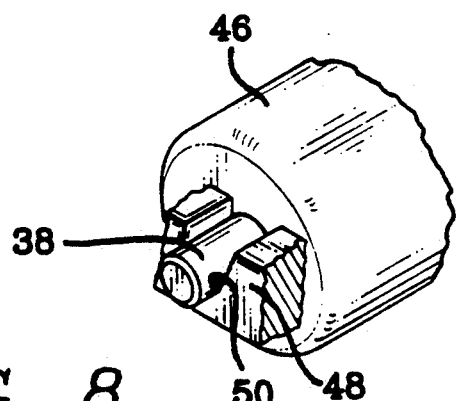
FIG. 8 is a partial oblique view of a retaining ring assembled to a pin of the present invention.

As shown in FIG. 8, one edge of retaining ring 48 contains a series of notches 50, each corresponding to one pin 38 which fits therein for simple positive assembly. Retaining ring 48 is then bonded to each pin 38 at an area of about one half of the circumference of each pin 38. Bonding may be by welding, brazing or adhesive.

Figure 9:
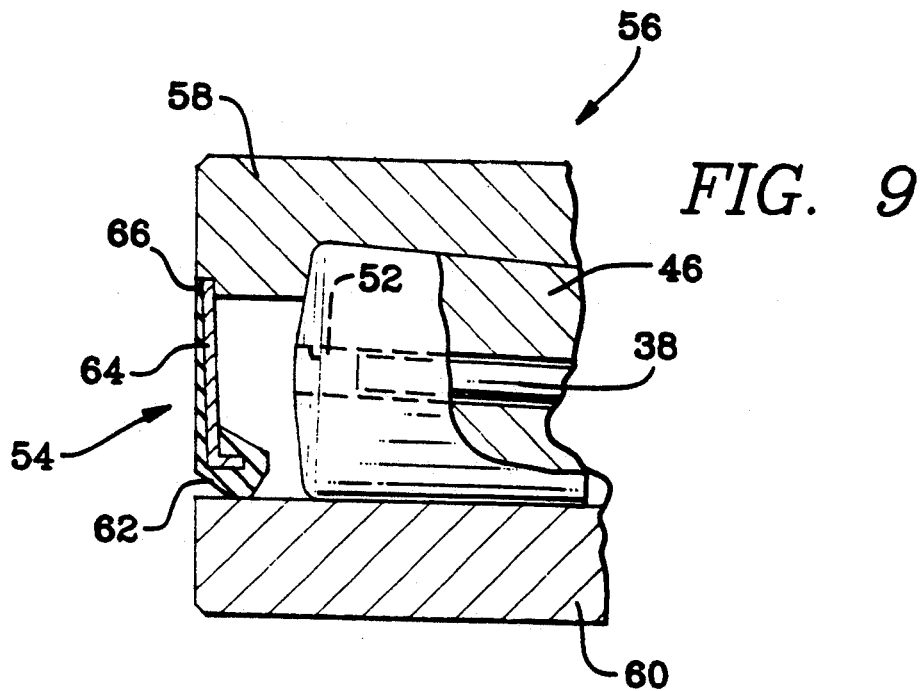
FIG. 9 is a partial cross-sectional view of a bearing assembly including an embodiment of the present invention and adapted for use with a seal.

Referring now to FIG. 9, in another embodiment, retaining ring 48 (FIG. 7) is not required; pin 38 does not extend completely through a bore 52 in a roller 46. In this embodiment an annular seal assembly 54 is positioned around the perimeter of a bearing assembly 56 to seal the space between an upper race 58 and a lower race 60, and thereby prevent entry of contaminants and exit of lubricant. Seal assembly 54 includes a rubber bonded seal 62 that is supported by an annular seal support 64 that is press fit on a recess 66 in upper race 58.

Figure 10:
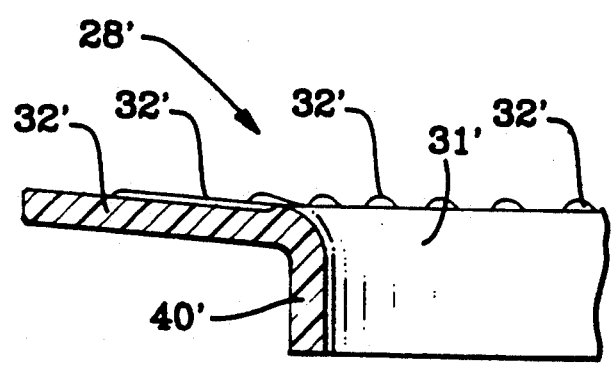
FIG. 10 is a partial cross-sectional view of an embodiment of the present invention taken along the line 10—10 of FIG. 3.

Referring now to FIG. 10, a pin type retainer similar to stamped pin type retainer 41 is formed of a suitable plastic resin material, preferably by injection molding. As in prior embodiments, pin type retainer 41' includes a ring 40' with a plurality of pins 32'. Any suitable plastic resin material may be used such as, for example, nylon, polyetherketone (PEK) or polyetheretherketone (PEEK). The plastic resin may contain a proportion of glass, or other filler, for strength, rigidity and/or wear resistance. The embodiment of FIG. 10 is preferably used with a retaining ring corresponding to retaining ring 48 of FIG. 7. Bonding may be by adhesive bonding, heat, or other techniques.

Advantages of the present invention include the following:

Reduced cost. Stamped pin type retainer 41 is manufactured in one piece from cup 28, thus requiring no assembly, and reducing labor compared to previous manufacturing methods.

Simplified handling. Cup 28 provides a rigid structure because bottom 34 is retained as part of cylindrical wall 30 until the final stages of processing. Bottom 34 also provides a platform for aligning cup 28 on a fixture for precision stamping.

Versatile structure. Bearing assembly 10 can be modified as bearing assembly 56 to accommodate seal 52 to prevent contaminants from entering the bearing assembly.

Having described the invention, what is claimed is:

1. A stamped pin bearing retainer comprising:
   a drawn ring;
   a plurality of equally spaced pins projecting from at least one side of said ring;
   said pins being one piece with said ring; and
   said pins being induction hardened without hardening said ring.

2. The stamped pin bearing retainer of claim 1, wherein said pins extend radially outward from said ring.

3. The stamped pin bearing retainer according to claim 1, wherein a cross-section of said pins is circular.

4. The stamped pin retainer according to claim 1, wherein a cross section of said pins is rectangular.

Figure 6:
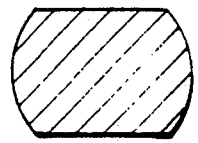
FIG. 6 is a cross-sectional view of an embodiment of the present invention, taken along the line 4—4 of FIG. 3, wherein the pins have a modified circular cross-section.

5. The stamped pin retainer according to claim 1, wherein a cross section of said pins is as shown in FIG. 6.

6. A pin retainer assembly for bearings, including roller bearings in a roller bearing assembly in which the rollers have axial bores, the retainer assembly comprising:
   a first ring;
   a plurality of equally spaced pins projecting from at least one side of said first ring, the pins having a free end;
   said pins being one piece with said ring;
   said pins being shaped to be inserted in and extend through the axial bores in the rollers of the roller bearing assembly;
   a second ring having a plurality of evenly spaced slots along one edge thereof engageable with the free ends of said pins such that said roller are held on said pins, wherein said pins are hardened and said first ring is not hardened.

7. The pin retainer assembly according to claim 6, wherein said first ring, pins and second ring are of the same material.

8. A pin retainer for a bearing having rollers, the retainer comprising:
- an open cup of a single and unitary piece of material;
- the cup having a broad flange ringing the open portion of the cup and a bottom and a cylindrical wall;
- pins formed in the broad flange by the removal of a portion of said broad flange;
- the pins forming axles for the rollers; and
- a continuous ring devoid of any bonds being formed by the cylindrical wall after the removal of a portion of the bottom of said cup.

9. The pin retainer assembly according to claim 8, wherein said continuous ring is formed by the cylindrical wall after the removal of a portion of the cylindrical wall of the cup adjacent to the bottom of the cup.

10. The pin retainer assembly according to claim 8, wherein the material is metal.

11. The pin assembly according to claim 8, wherein the material is a plastic resin.

12. A pin retainer for a bearing having rollers, the retainer comprising:
- an open cup of a single and unitary piece of material;
- the cup having a broad flange ringing the open portion of the cup and a bottom and a cylindrical wall;
- pins formed in the broad flange by the removal of a portion of said broad flange;
- the pins forming axles for the rollers; and
- a continuous ring devoid of any bonds being formed by the cylindrical wall after the removal of a portion of the cylindrical wall of the cup.

* * * * *